United States Patent
Chen et al.

(10) Patent No.: US 10,656,727 B2
(45) Date of Patent: May 19, 2020

(54) KEYBOARD DEVICE

(71) Applicant: Primax Electronics Ltd., Taipei (TW)

(72) Inventors: Bo-An Chen, Taipei (TW); Chih-Feng Chien, Taipei (TW); Yi-Guang Chen, Taipei (TW); Chin-Sung Pan, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 259 days.

(21) Appl. No.: 15/962,137

(22) Filed: Apr. 25, 2018

(65) Prior Publication Data
US 2019/0221383 A1 Jul. 18, 2019

(30) Foreign Application Priority Data

Jan. 12, 2018 (TW) .............................. 107101271 A

(51) Int. Cl.
*G06F 3/023* (2006.01)
*H01H 13/704* (2006.01)
*G06F 3/02* (2006.01)
*H01H 13/705* (2006.01)

(52) U.S. Cl.
CPC .......... *G06F 3/0233* (2013.01); *G06F 3/0202* (2013.01); *H01H 13/704* (2013.01); *H01H 13/705* (2013.01)

(58) Field of Classification Search
CPC ............ H01H 13/70–7073; G06F 3/02; G06F 3/023–0238
See application file for complete search history.

(56) References Cited

U.S. PATENT DOCUMENTS

| | | | | |
|---|---|---|---|---|
| 8,314,352 B2* | 11/2012 | Huang | ................. | G06F 3/0202 200/1 B |
| 9,620,307 B2* | 4/2017 | Chen | ................. | H01H 13/7065 |
| 10,073,539 B2* | 9/2018 | Lee | ........................ | G06F 3/0233 |
| 2006/0232446 A1* | 10/2006 | Li | ........................... | G06F 3/023 341/26 |
| 2007/0212152 A1* | 9/2007 | Chen | ..................... | G06F 3/0219 400/489 |
| 2012/0024682 A1* | 2/2012 | Huang | ................. | G06F 3/0202 200/5 A |
| 2013/0249715 A1* | 9/2013 | Shih | ...................... | H03M 11/02 341/22 |
| 2017/0032909 A1* | 2/2017 | Chen | ................. | H01H 13/7065 |
| 2017/0062012 A1* | 3/2017 | Bloch | .................... | G11B 27/34 |

(Continued)

*Primary Examiner* — Patrick F Marinelli
(74) *Attorney, Agent, or Firm* — Kirton McConkie; Evan R. Witt

(57) ABSTRACT

A keyboard device includes plural keys, a control unit and a membrane switch circuit member. The membrane switch circuit member includes a first upper key switch and a first lower key switch. When the first upper key switch is triggered by the first key, a first key code corresponding to the first key is generated by the first upper key switch. When the first lower key switch is triggered by the first key, a second key code corresponding to the first key is generated by the first lower key switch. The control unit is connected with the membrane switch circuit member. If both of the first key code and the second key code are received by the control unit, a key signal is outputted. If either the first key code or the second key code is received by the control unit, the key signal is not outputted.

10 Claims, 5 Drawing Sheets

(56) References Cited

U.S. PATENT DOCUMENTS

| | | | | |
|---|---|---|---|---|
| 2018/0120951 A1* | 5/2018 | Lee | ............... | G06F 3/0233 |
| 2018/0330898 A1* | 11/2018 | Chen | ............... | H01H 13/7073 |
| 2019/0052285 A1* | 2/2019 | Chen | ............... | H03M 11/003 |
| 2019/0074848 A1* | 3/2019 | Kuo | ............... | H03M 11/003 |

* cited by examiner

KEYBOARD DEVICE

FIELD OF THE INVENTION

The present invention relates to a keyboard device, and more particularly to a keyboard device with a membrane switch circuit member.

BACKGROUND OF THE INVENTION

Generally, the widely-used peripheral input device of a computer system includes for example a mouse device, a keyboard device, a trackball device, or the like. Via the keyboard device, characters or symbols can be directly inputted into the computer system. As a consequence, most users and most manufacturers of input devices pay much attention to the development of keyboard devices. For example, a keyboard device with scissors-type connecting elements is one of the widely-used keyboard devices.

The structure of a keyboard device with scissors-type connecting elements will be described as follow. FIG. 1 is a schematic cross-sectional view illustrating a conventional keyboard device. The conventional keyboard device 1 comprises plural keys 10, a membrane switch circuit member 11 and a supporting plate 12. Each key 10 comprises a keycap 101, a scissors-type connecting element 102 and an elastic element 103. In the key 10, the keycap 101 is exposed outside the conventional keyboard device 1. Consequently, the keycap 101 can be depressed by the user. The scissors-type connecting element 102 is used for connecting the keycap 101 and the supporting plate 12. The elastic element 103 is penetrated through the scissors-type connecting element 102. In addition, both ends of the elastic element 103 are contacted with the keycap 101 and the membrane switch circuit member 11, respectively. The supporting plate 12 is located under the membrane switch circuit member 11. The keycap 101, the scissors-type connecting element 102, the elastic element 103 and the membrane switch circuit member 11 are supported on the supporting plate 12.

The membrane switch circuit member 11 comprises an upper wiring board 111, a separation layer 112, and a lower wiring board 113. The upper wiring board 111 has plural upper contacts 1111. The separation layer 112 is located under the upper wiring board 111, and comprises plural perforations 1121 corresponding to the plural upper contacts 1111. The lower wiring board 113 is located under the separation layer 112, and comprises plural lower contacts 1131 corresponding to the plural upper contacts 1111. The plural lower contacts 1131 and the plural upper contacts 1111 are collectively defined as plural key switches. The elastic elements 103 are disposed on the membrane switch circuit member 11 and aligned with the corresponding key switches.

The operations of the key 10 of the conventional keyboard device 1 in response to the depressing action of the user will be illustrated as follows. Please refer to FIG. 1 again. When the keycap 101 is depressed, the keycap 101 is moved downwardly to push the scissors-type connecting element 102 in response to the depressing force. As the keycap 101 is moved downwardly relative to the supporting plate 12, the keycap 101 pushes the corresponding elastic element 103. At the same time, the elastic element 103 is subjected to deformation to push the membrane switch circuit member 11 and trigger the corresponding key switch of the membrane switch circuit member 11. Consequently, the membrane switch circuit member 11 generates a corresponding key signal. When the keycap 101 is no longer depressed by the user, no external force is applied to the keycap 101 and the elastic element 103 is no longer pushed by the keycap 101. In response to the elasticity of the elastic element 103, the elastic element 103 is restored to its original shape to provide an upward elastic restoring force. Consequently, the keycap 101 is returned to its original position where it is not depressed. The structures and the operations of the conventional keyboard device have been mentioned as above.

Conventionally, the keys of the keyboard device are arranged in a keyboard matrix. When one keycap is depressed, a keyboard controller realizes the information of the depressed keycap according to the column information and the row information and outputs the corresponding key signal. Generally, the intersection between each row and each column of the keyboard matrix represents a corresponding key intersection. When one keycap is triggered, the keyboard device starts to scan the keyboard matrix and recognizes which keycap is depressed. For example, the keyboard controller scans all columns of the keyboard matrix sequentially. If the corresponding signal is received from a specified row when a specified column is scanned by the keyboard controller, the keyboard controller can realize which keycap is depressed according to the received column information and row information.

The minimum matrix unit of the keyboard matrix is composed of four keys. When any of the four keys is depressed, the corresponding key signal can be successfully generated. When two of the four keys are arbitrarily depressed, the keyboard controller can realize which keys are triggered according to the column information and the row information. However, when three keys are simultaneously depressed, the information of two rows and the information of two columns are transmitted to the keyboard controller. Since four keys are defined by two rows and two columns, the keyboard controller cannot recognize the three depressed keys from the four keys according to the column information and the row information only. Under this circumstance, the fourth key is erroneously judged as the on-state key. That is, the fourth key is referred as a ghost key.

For avoiding the ghosting problem, two approaches have been disclosed. In accordance with a first approach, the keyboard device is further equipped with plural diodes near the corresponding key intersections. Since the current is allowed to pass through the membrane switch circuit member in one direction through the arrangement of the diodes, the erroneous judgment of the ghosting problem is avoided. However, the approach of installing diodes near the corresponding key intersection still has some drawbacks. Firstly, the diode is not cost-effective. Consequently, the cost of the keyboard device is increased. Secondly, the plural diodes on the membrane switch circuit member increase the thickness of the membrane switch circuit member. The increased thickness of the membrane switch circuit member is detrimental to the slimness of the keyboard device. Thirdly, the process of welding the diodes at the positions near the corresponding key intersections is very complicated.

In accordance with a second approach, the keyboard device is not equipped with the keyboard matrix. The output wire of each key is connected with a microprocessor of the keyboard device. Since this approach needs a great number of output wires, it is difficult to install the output wires. For example, in case that the keyboard device contains 144 keys, the keyboard device comprises 144 output wires. Consequently, it is difficult to install so many output wires.

Therefore, there is a need of providing a keyboard device with low cost and capable of avoiding the ghosting problem.

SUMMARY OF THE INVENTION

An object of the present invention provides a keyboard device with low cost and capable of avoiding the ghosting problem.

In accordance with an aspect of the present invention, there is provided a keyboard device. The keyboard device includes a first key, a membrane switch circuit member and a control unit. The first key is exposed outside the keyboard device. The membrane switch circuit member is located under the first key. When the first key is depressed, the membrane switch circuit member is pressed by the first key. The membrane switch circuit member includes a first upper key switch corresponding to the first key and a first lower key switch corresponding to the first key. When the first upper key switch is triggered by the first key, a first key code corresponding to the first key is generated by the first upper key switch. When the first lower key switch is triggered by the first key, a second key code corresponding to the first key is generated by the first lower key switch. The control unit is connected with the membrane switch circuit member. A key signal is selectively outputted from the control unit according the first key code and the second key code. If both of the first key code and the second key code are received by the control unit, the key signal corresponding to the first key is outputted from the control unit. If either the first key code or the second key code is received by the control unit, the key signal corresponding to the first key is not outputted from the control unit.

In an embodiment, a first upper row line and a first upper column line are collaboratively formed as the first upper key switch, a second upper row line and a second upper column line are collaboratively formed as the second upper key switch, and the first upper key switch and second upper key switch are collaboratively formed as a first key matrix. A first lower row line and a first lower column line are collaboratively formed as the first lower key switch, a second lower row line and a third lower column line are collaboratively formed as the second lower key switch, and the first lower key switch and the second lower key switch are collaboratively formed as a second key matrix. The first key matrix and the second key matrix have different arrangements.

In an embodiment, the arrangement of the first key matrix is identical to an arrangement of the first key and the second key, and the arrangement of the second key matrix is different from the arrangement of the first key and the second key.

In an embodiment, the control unit contains plural first predetermined key codes corresponding to a first key matrix and plural second predetermined key codes corresponding to a second key matrix. If the control unit receives both of the first key code and the second key code, the control unit acquires the first predetermined key code corresponding to the first key from the plural first predetermined key codes and acquires the second predetermined key code corresponding to the first key from the plural second predetermined key codes. Moreover, the key signal corresponding to the first key is outputted from the control unit according to the first predetermined key code corresponding to the first key and the second predetermined key code corresponding to the first key.

In an embodiment, if the control unit receives the first key code but does not receive the second key code, the control unit acquires the first predetermined key code corresponding to the first key from the plural first predetermined key codes and does not acquire the corresponding second predetermined key code, the key signal corresponding to the first key is not outputted from the control unit. If the control unit receives the second key code but does not receive the first key code, the control unit acquires the second predetermined key code corresponding to the first key from the plural second predetermined key codes and does not acquire the corresponding first predetermined key code, the key signal corresponding to the first key is not outputted from the control unit.

From the above descriptions, the membrane switch circuit member of the keyboard device of the present invention is a multi-layered structure. Moreover, each key is aligned with the corresponding upper-layered intersection and the corresponding lower-layered intersection. Consequently, the membrane switch circuit member comprises two key matrices. The arrangements of the two key matrices are different. As know, the ghost key is not physically depressed. Due to this feature, the keyboard device of the present invention is designed to generate the key signal when the key codes from the two key matrices are received by the control unit. Since the plural key matrices have different arrangements, the ghosting problem can be effectively solved. In comparison with the first approach of the conventional technology, it is not necessary to install a great number of diodes in the keyboard device of the present invention. Consequently, the keyboard device of the present invention is cost-effective and capable of avoiding the ghosting problem. In comparison with the second approach of the conventional technology, the keyboard device of the present invention has less number of conducting lines. Consequently, the wiring method of the output circuit is simplified.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
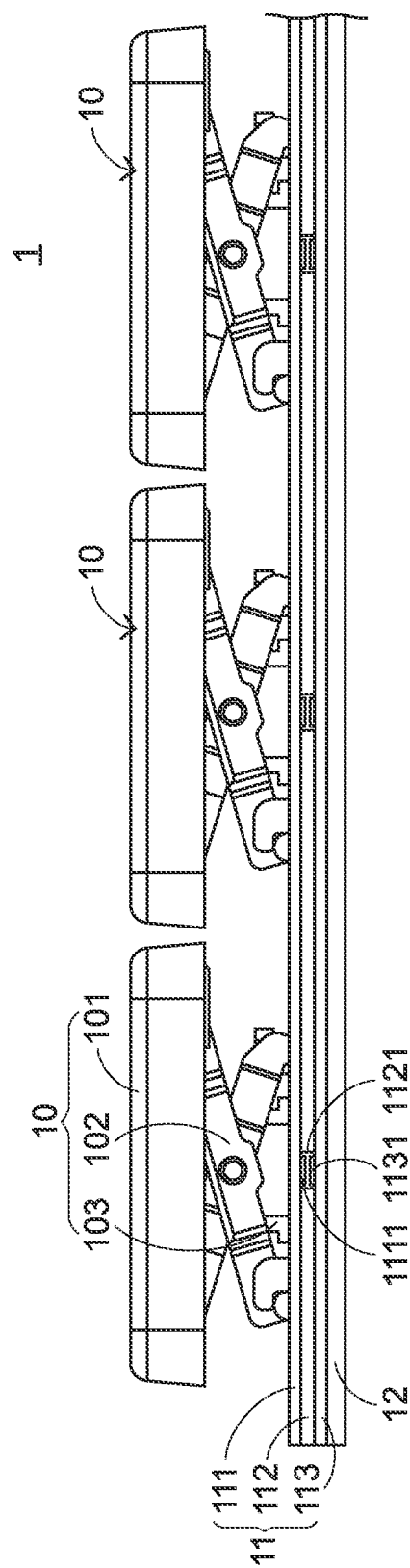
FIG. 1 is a schematic cross-sectional view illustrating a conventional keyboard device.
Figure 2:
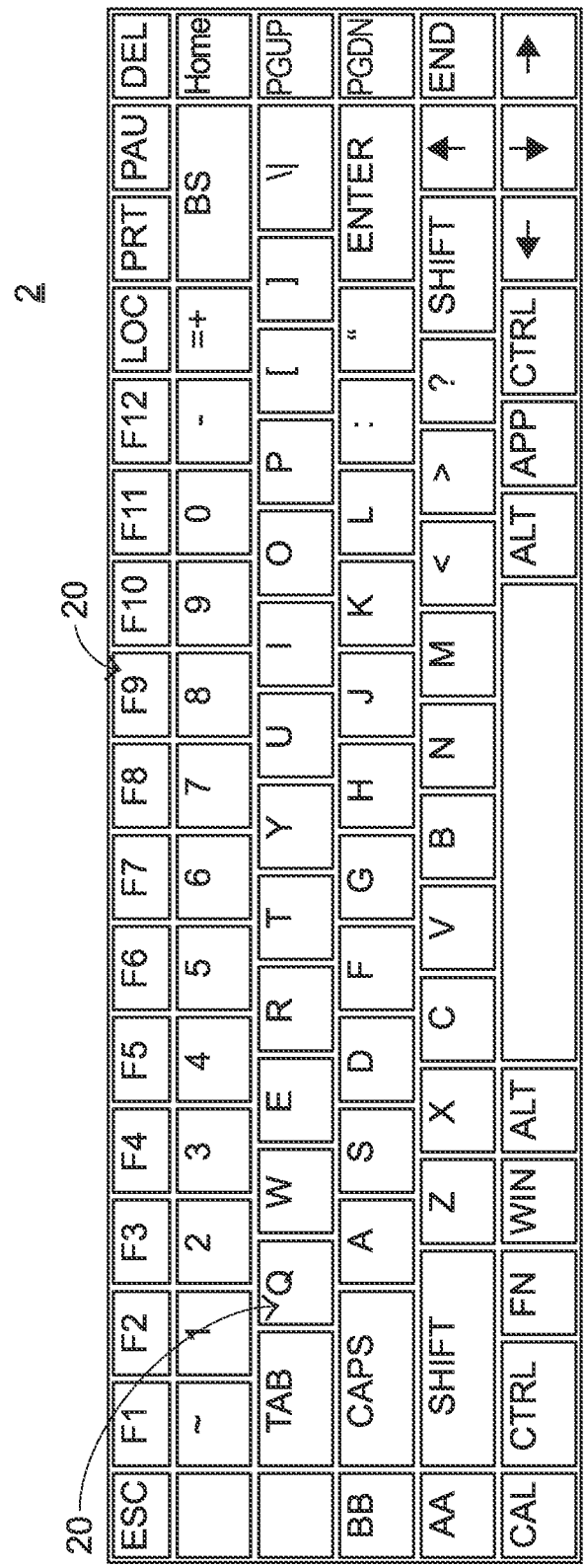
FIG. 2 is a schematic top view illustrating the outer appearance of a keyboard device according to an embodiment of the present invention.

For solving the drawbacks of the conventional technologies, the present invention provides a keyboard device. The structure of a keyboard device of the present invention will be described as follow. FIG. 2 is a schematic top view illustrating the outer appearance of a keyboard device according to an embodiment of the present invention. The arrangement of plural keys 20 of the keyboard device 2 is shown in FIG. 2.

Figure 3:
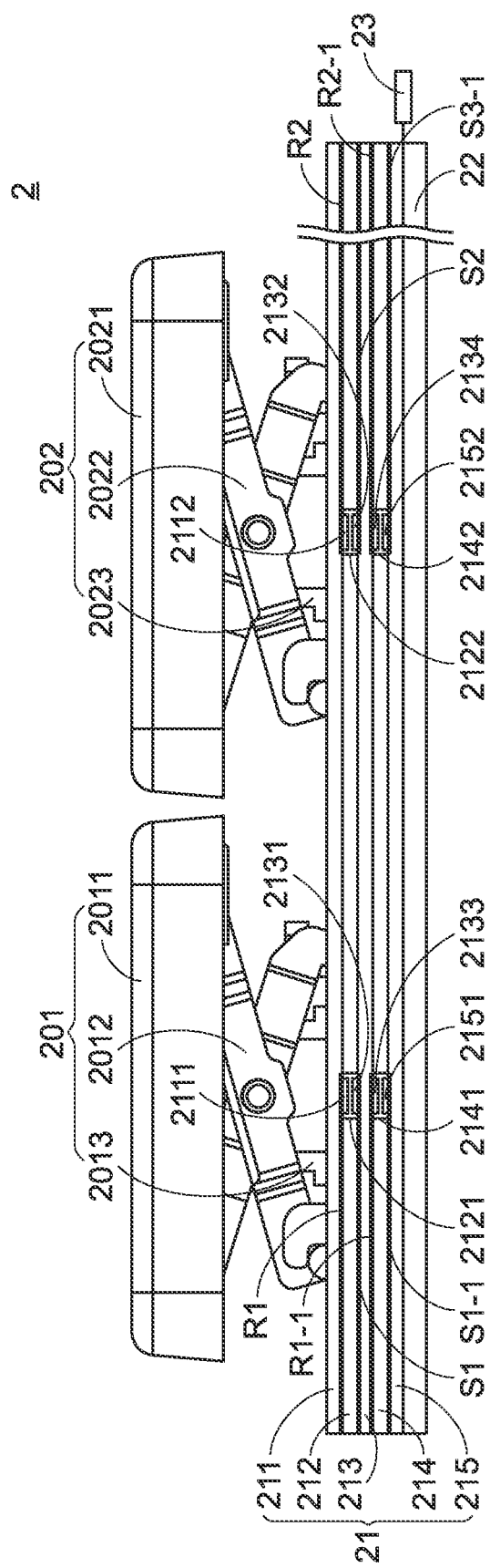
FIG. 3 is a schematic cross-sectional view illustrating a portion of the keyboard device according to the embodiment of the present invention.

The inner structure of the keyboard device 2 will be described as follows. FIG. 3 is a schematic cross-sectional view illustrating a portion of the keyboard device according to the embodiment of the present invention. The keyboard device 2 comprises plural keys 20, a membrane switch circuit member 21, a supporting plate 22 and a control unit 23. For succinctness, a first key 201 and a second key 202 of the plural keys 20 are shown. The first key 201 and the second key 202 are exposed to a top surface of the keyboard device 2 and connected with the supporting plate 22. When one of the first key 201 and the second key 202 is depressed, the key 20 is moved downwardly relative to the supporting plate 22.

The first key 201 comprises a first keycap 2011, a first scissors-type connecting element 2012 and a first elastic element 2013. The first keycap 2011 is exposed outside the top surface of the keyboard device 2 so as to be depressed by the user. The first scissors-type connecting element 2012 is arranged between the supporting plate 22 and the corresponding first keycap 2011. The first scissors-type connecting element 2012 is used for connecting the supporting plate 22 and the first keycap 2011 and allowing the first keycap 2011 to be moved upwardly or downwardly relative to the supporting plate 22. The first elastic element 2013 is disposed under the corresponding first keycap 2011 and penetrated through the corresponding first scissors-type connecting element 2012. The first elastic element 2013 is used for providing an elastic force to the first keycap 2011. In response to the elastic force, the first keycap 2011 is moved upwardly and returned to its original position.

Similarly, the second key 202 comprises a second keycap 2021, a second scissors-type connecting element 2022 and a second elastic element 2023. The second keycap 2021 is exposed outside the top surface of the keyboard device 2 so as to be depressed by the user. The second scissors-type connecting element 2022 is arranged between the supporting plate 22 and the corresponding second keycap 2021. The second scissors-type connecting element 2022 is used for connecting the supporting plate 22 and the second keycap 2021 and allowing the second keycap 2021 to be moved upwardly or downwardly relative to the supporting plate 22. The second elastic element 2023 is disposed under the corresponding second keycap 2021 and penetrated through the corresponding second scissors-type connecting element 2022. The second elastic element 2023 is used for providing an elastic force to the second keycap 2021. In response to the elastic force, the second keycap 2021 is moved upwardly and returned to its original position.

The membrane switch circuit member 21 is arranged between the supporting plate 22 and the plural keys 20. When the membrane switch circuit member 21 is pressed by the first key 201 or the second key 202, a corresponding key signal is generated. The supporting plate 22 is located under the membrane switch circuit member 21. The plural keys 20 and the membrane switch circuit member 21 are supported by the supporting plate 22. In FIG. 3, the supporting plate 22 comprises plural hooks (not shown) corresponding to the keys 20. The hooks are connected with the corresponding first scissors-type connecting element 2012 or the corresponding second scissors-type connecting element 2022, so that the first keycap 2011 or the second keycap 2021 is fixed on the supporting plate 22.

The control unit 23 is connected with the membrane switch circuit member 21. According to the received key information, the control unit 23 issues a corresponding key signal. The operations of the control unit 23 will be described as follows.

In this embodiment, the keyboard device 2 is a keyboard device for a notebook computer. Moreover, the first scissors-type connecting element 2012 is a scissors-type connecting element (also referred as a scissors member) that is swung with the movement of the first keycap 2011. Moreover, the first elastic element 2013 is a rubbery elastomer. The examples of the above components are presented herein for purpose of illustration and description only. In another embodiment, the crater-shaped connecting elements for a desktop computer can be used to connect and move the first keycap and the second key cap. In a further embodiment, the first keycap and the second keycap are moved upwardly or downwardly in response to magnetic forces.

The structure of the membrane switch circuit member 21 will be described in more details as follows. As shown in FIG. 3, the membrane switch circuit member 21 comprises a first board 211, a second board 212, a third board 213, a fourth board 214 and a fifth board 215.

The first board 211 is located under the first elastic elements 2013 and the second elastic element 2023 of the plural keys 20. The first board 211 comprises a first upper contact 2111 corresponding to the first key 201 and a second upper contact 2112 corresponding to the second key 202. The first upper contact 2111 and the second upper contact 2112 are disposed on a bottom surface of the first board 211.

The second board 212 is located under the first board 211. The second board 212 comprises a first opening 2121 corresponding to the first upper contact 2111 and a second opening 2122 corresponding to the second upper contact 2112. The first opening 2121 and the second opening 2122 run through the second board 212.

The third board 213 is located under the second board 212. The third board 213 comprises a first lower contact 2131, a second lower contact 2132, a third upper contact 2133 and a fourth upper contact 2134. The first lower contact 2131 is aligned with the first upper contact 2111 and the first opening 2121. The second lower contact 2132 is aligned with the second upper contact 2112 and the second opening 2122. The first lower contact 2131 and the second lower contact 2132 are disposed on a top surface of the third board 213. The third upper contact 2133 and the fourth upper contact 2134 are disposed on a bottom surface of the third board 213.

The fourth board 214 is located under the third board 213. The fourth board 214 comprises a third opening 2141 corresponding to the third upper contact 2133 and a fourth opening 2142 corresponding to the fourth upper contact 2134. The third opening 2141 and the fourth opening 2142 run through the fourth board 214.

The fifth board 215 is located under the fourth board 214. The fifth board 215 comprises a third lower contact 2151 and a fourth lower contact 2152. The third lower contact 2151 is aligned with the third upper contact 2133 and the third opening 2141. The fourth lower contact 2152 is aligned with the fourth upper contact 2134 and the fourth opening 2142. The third lower contact 2151 and the fourth lower contact 2152 are disposed on a top surface of the fifth board 215.

Please refer to FIG. 3. The first upper contact 2111, the first opening 2121 and the first lower contact 2131 are collaboratively defined as a first upper-layered intersection. The third upper contact 2133, the third opening 2141 and the third lower contact 2151 are collaboratively defined as a first lower-layered intersection. The first upper-layered intersection and the first lower-layered are aligned with the first key

201. The second upper contact 2112, the second opening 2122 and the second lower contact 2132 are collaboratively defined as a second upper-layered intersection. The fourth upper contact 2134, the fourth opening 2142 and the fourth contact 2152 are collaboratively defined as a second lower-layered intersection. The second upper-layered intersection and the second lower-layered are aligned with the second key 202.

It is noted that the supporting plate of the keyboard device is not restrictedly located under the membrane switch circuit member. For example, the supporting plate may be located over the membrane switch circuit member according to the practical requirements. However, the supporting plate comprises supporting plate openings corresponding to the elastic elements. The elastic elements are penetrated through the supporting plate openings. Consequently, the membrane switch circuit member can be triggered by the elastic elements.

Figure 4:
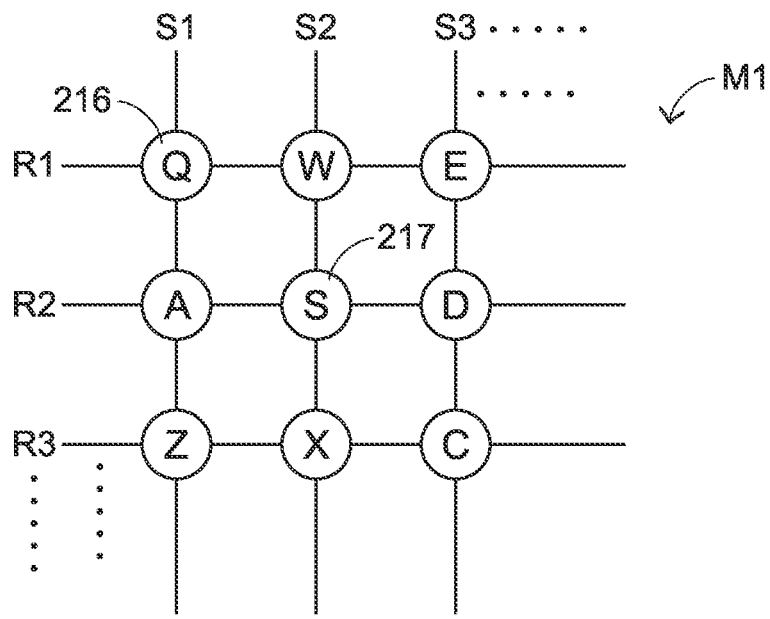
FIG. 4 schematically illustrates a portion of a first key matrix of the keyboard device according to the embodiment of the present invention.
Figure 5:
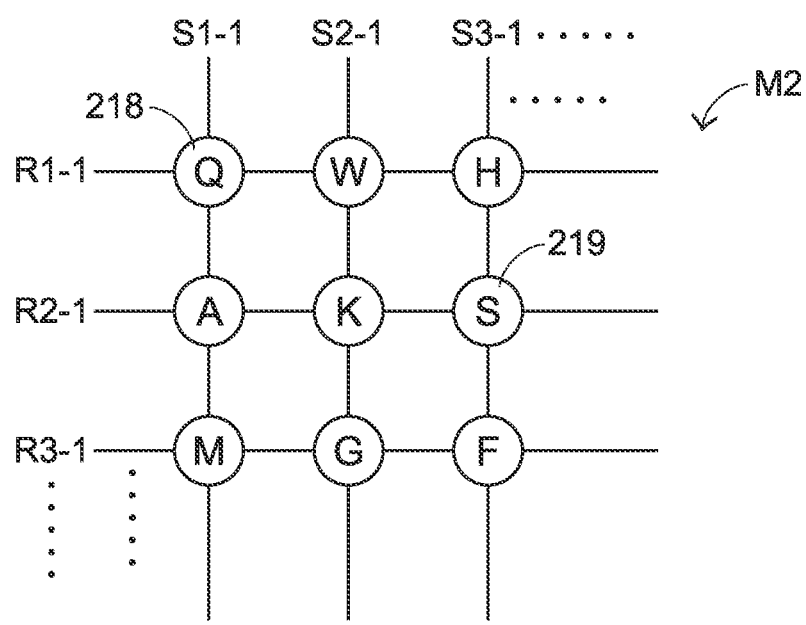
FIG. 5 schematically illustrates a portion of a second key matrix of the keyboard device according to the embodiment of the present invention.

Please refer to FIGS. 3, 4 and 5. FIG. 4 schematically illustrates a portion of a first key matrix of the keyboard device according to the embodiment of the present invention. FIG. 5 schematically illustrates a portion of a second key matrix of the keyboard device according to the embodiment of the present invention. In FIG. 4, the first key matrix M1 of the membrane switch circuit member 21 is shown. The first key matrix M1 is formed by a first upper key switch 216, a second upper key switch 217 and other upper key switches collaboratively. In FIG. 5, the second key matrix M2 of the membrane switch circuit member 21 is shown. The second key matrix M2 is formed by a first lower key switch 218, a second lower key switch 219 and other lower key switches collaboratively. As shown in FIGS. 3, 4 and 5. The first upper contact 2111 is electrically connected with the first upper key switch 216 through a first upper row line R1. The first lower contact 2131 is electrically connected with the first upper key switch 216 through a first upper column line S1. The second upper contact 2112 is electrically connected with the second upper key switch 217 through a second upper row line R2. The second lower contact 2132 is electrically connected with the second upper key switch 217 through a second upper column line S2. The third upper contact 2133 is electrically connected with the first lower key switch 218 through a first lower row line R1-1. The third lower contact 2151 is electrically connected with the first lower key switch 218 through a first lower column line S1-1. The fourth upper contact 2134 is electrically connected with the second lower key switch 219 through a second lower row line R2-1. The fourth contact 2152 is electrically connected with the second lower key switch 219 through a third lower column line S3-1.

The first upper row line R1 and the first upper column line S1 are collaboratively formed as the first upper key switch 216. The second upper row line R2 and the second upper column line S2 are collaboratively formed as the second upper key switch 217. The first lower row line R1-1 and the first lower column line S1-1 are collaboratively formed as the first lower key switch 218. The second lower row line R2-1 and the third lower column line S3-1 are collaboratively formed as the second lower key switch 219. Please refer to FIG. 4. The first upper key switch 216 is aligned with the key "Q". The second upper key switch 217 is aligned with the key "S". That is, the first key 201 is the key "Q", and the second key 202 is the key "S". The arrangements of the first upper key switch 216, the second upper key switch 217 and the other upper key switches of the first key matrix M1 are similar to the arrangements of the plural keys 20 of the keyboard device 2.

Please refer to FIG. 5. The first lower key switch 218 is aligned with the key "Q". The second lower key switch 219 is aligned with the key "S". However, the arrangements of the first lower row line R1-1, the first lower column line S1-1, the second lower row line R2-1 and the third lower column line S3-1 of the second key matrix M2 are different from the arrangements of the lines of the first key matrix M1. That is, the arrangement of the first key matrix M1 and the arrangement of the second key matrix M2 are different.

In other words, the keyboard device 2 has the following physical structure. The first upper-layered intersection and the first lower-layered intersection are located under the first key 201. The second upper-layered intersection and the second lower-layered intersection are located under the second key 202. Moreover, the first upper row line R1, the first upper column line S1, the second upper row line R2 and the second upper column line S2 of the first key matrix M1 have special arrangements. Consequently, the position relationship between the first upper key switch 216 and the second upper key switch 217 of the first key matrix M1 is identical to the position relationship between the first key 201 and the second key 202 of the plural keys 20. Similarly, the first lower row line R1-1, the first lower column line S1-1, the second lower row line R2-1 and the third lower column line S3-1 of the second key matrix M2 have special arrangements. Consequently, the position relationship between first lower key switch 218 and the second lower key switch 219 of the second key matrix M2 is different from the position relationship between the first key 201 and the second key 202 of the plural keys 20. That is, the arrangement of the first key matrix M1 and the arrangement of the second key matrix M2 are different.

Figure 6:
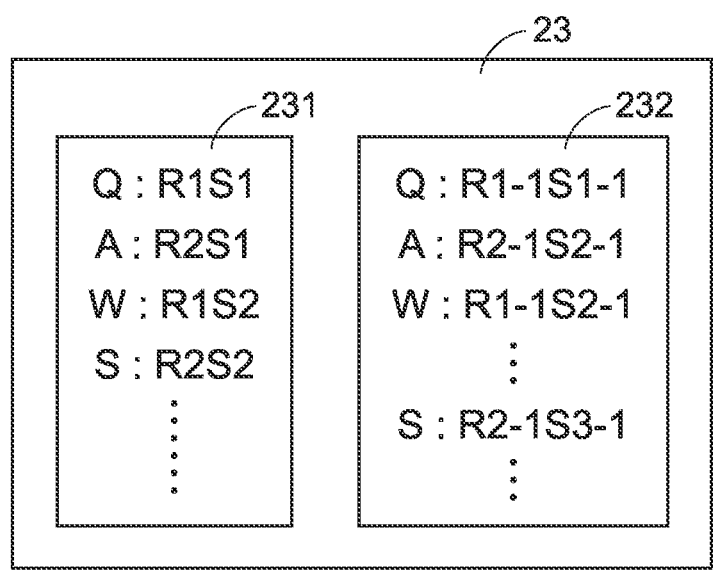
FIG. 6 is a schematic functional block diagram illustrating the control unit of the keyboard device according to the embodiment of the present invention.

The architecture of the control unit 23 will be described as follows. FIG. 6 is a schematic functional block diagram illustrating the control unit of the keyboard device according to the embodiment of the present invention. The control unit 23 comprises plural first predetermined key codes 231 corresponding to the first key matrix M1 and plural second predetermined key codes 232 corresponding to the second key matrix M2. For example, the plural first predetermined key codes 231 includes "R1S1", "R2S2", . . . , and so on. The first predetermined key code "R1S1" is related to the first upper key switch 216 of the first key 201. The first predetermined key code "R2S2" is related to the second upper key switch 217 of the second key 202. For example, the plural second predetermined key codes 232 include "R1-1S1-1", "R2-1S3-1", . . . , and so on. The second predetermined key code "R1-1S1-1" is related to the first lower key switch 218 of the first key 201. The second predetermined key code "R2-1S3-1" is related to the second lower key switch 219 of the second key 202.

The operations of the keyboard device 2 will be described as follows. Please refer to FIGS. 3, 4, 5 and 6. When the key "Q" is depressed by the user, the components corresponding to the key "Q" are enabled to press the first upper-layered intersection and the first lower-layered intersection. Consequently, the first upper key switch 216 corresponding to the first upper-layered intersection is triggered, and a first key code "R1S1" corresponding to the key "Q" is generated. At the same time, the first lower key switch 218 corresponding to the first lower-layered intersection is triggered, and a second key code "R1-1S1-1" corresponding to the key "Q" is generated. That is, the first key code "R1S1" is generated when the first upper row line R1 and the first upper column line S1 are triggered. Similarly, the second key code "R1-1S1-1" is generated when the first lower row line R1-1 and the first lower column line S1-1 are triggered. Moreover, the first key code "R1S1" and the second key code "R1-1S1-1" are transmitted to the control unit 23.

After the control unit 23 receives the first key code "R1S1" and the second key code "R1-1S1-1", the control unit 23 acquires the first predetermined key code "R1S1" corresponding to the first key 201 from the plural first predetermined key codes 231 and acquires the second predetermined key code "R1-1S1-1" corresponding to the first key 201 from the plural second predetermined key codes 232. Since the first predetermined key code "R1S1" is related to the key "Q" and the second predetermined key code "R1-1S1-1" is also related to the key "Q", the control unit 23 realizes that the key "Q" is depressed according to the first predetermined key code "R1S1" and the second predetermined key code "R1-1S1-1". Consequently, the key signal corresponding to the key "Q" is outputted from the control unit 23. In addition, a command corresponding to the key "Q" is executed by a computer (not shown), which is connected with the keyboard device 2.

When the key "W" is depressed by the user, the components corresponding to the key "W" are enabled. The operation of enabling the key "W" is similar to the above operation of enabling the key "Q". Consequently, the first key code "R1S2" and the second key code "R1-1S2-1" are transmitted to the control unit 23. Similarly, the control unit 23 acquires the first predetermined key code "R1S2" and the second predetermined key code "R1-1S2-1". The control unit 23 realizes that the key "W" is depressed according to the first predetermined key code "R1S2" and the second predetermined key code "R1-1S2-1". Consequently, the key signal corresponding to the key "W" is outputted from the control unit 23. In addition, a command corresponding to the key "W" is executed by the computer, which is connected with the keyboard device 2.

When all of the key "Q", the key "W" and the key "A" of the first key matrix M1 are triggered, the key "S" is in the ghosting condition. Consequently, the first key code "R2S2" corresponding to the key "S" is transmitted from the first key matrix M1 to the control unit 23. When all of the key "Q", the key "W" and the key "A" of the second key matrix M2 are triggered, the second key matrix M2 is not in the ghosting condition because the arrangements of the conductive lines of the second key matrix M2 corresponding to the key "Q", the key "W" and the key "A" are different from the arrangements of the conductive lines of the first key matrix M1. Moreover, the second key code "R2-1S3-1" corresponding to the key "S" is not transmitted to the control unit 23. In accordance with the setting of the control unit 23, the control unit 23 does not issue the key signal when only the first key code or the second key code is received. That is, since the control unit 23 judges that the second key code corresponding to the key "S" is not received, the key signal corresponding to the key "S" is not outputted from the control unit 23. Consequently, the keyboard device 2 of the present invention is capable of avoiding the ghosting problem.

From the above descriptions, the membrane switch circuit member of the keyboard device of the present invention is a multi-layered structure. Moreover, each key is aligned with the corresponding upper-layered intersection and the corresponding lower-layered intersection. Consequently, the membrane switch circuit member comprises two key matrices. The arrangements of the two key matrices are different. As know, the ghost key is not physically depressed. Due to this feature, the keyboard device of the present invention is designed to generate the key signal when the key codes from the two key matrices are received by the control unit. Since the plural key matrices have different arrangements, the ghosting problem can be effectively solved.

In comparison with the first approach of the conventional technology, it is not necessary to install a great number of diodes in the keyboard device of the present invention. Consequently, the keyboard device of the present invention is cost-effective and capable of avoiding the ghosting problem. In comparison with the second approach of the conventional technology, the keyboard device of the present invention has less number of conducting lines. Consequently, the wiring method of the output circuit is simplified.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:
1. A keyboard device, comprising:
 a first key exposed outside the keyboard device;
 a membrane switch circuit member located under the first key, wherein when the first key is depressed, the membrane switch circuit member is pressed by the first key, wherein the membrane switch circuit member comprises:
  a first upper key switch corresponding to the first key, wherein when the first upper key switch is triggered by the first key, a first key code corresponding to the first key is generated by the first upper key switch; and
  a first lower key switch corresponding to the first key and disposed underneath the first key switch, wherein when the first lower key switch is triggered by the first key, a second key code corresponding to the first key is generated by the first lower key switch; and
 a control unit connected with the membrane switch circuit member,
 wherein a key signal is selectively outputted from the control unit according the first key code and the second key code,
 wherein when both the first key code and the second key code are received by the control unit, the key signal corresponding to the first key is outputted from the control unit,
 wherein when the first key code is received by the control unit but does not receive the second key code, the key signal corresponding to the first key is not outputted from the control unit,
 wherein when the second key code is received by the control unit but does not receive the first key code, the key signal corresponding to the first key is not outputted from the control unit.

2. The keyboard device according to claim 1, wherein the keyboard device further comprises a second key, which is exposed outside the keyboard device and located adjacent to the first key, wherein the membrane switch circuit member further comprises:
 a second upper key switch corresponding to the second key, wherein when the second upper key switch is triggered by the second key, a third key code corresponding to the second key is generated by the second upper key switch;

a second lower key switch corresponding to the second key, wherein when the second lower key switch is triggered by the second key, a fourth key code corresponding to the second key is generated by the second lower key switch, wherein if both of the third key code and the fourth key code are received by the control unit, the key signal corresponding to the second key is outputted from the control unit, wherein if either the third key code or the fourth key code is received by the control unit, the key signal corresponding to the second key is not outputted from the control unit.

3. The keyboard device according to claim 2, wherein the membrane switch circuit member further comprises:
   a first board located under the first key and the second key, and comprising a first upper contact and a second upper contact;
   a second board located under the first board, and comprising a first opening and a second opening;
   a third board located under the second board, and comprising a first lower contact, a second lower contact, a third upper contact and a fourth upper contact;
   a fourth board located under the third board, and comprising a third opening and a fourth opening; and
   a fifth board located under the fourth board, and comprising a third lower contact and a fourth lower contact.

4. The keyboard device according to claim 3, wherein the first upper contact is electrically connected with the first upper key switch through a first upper row line, the first lower contact is electrically connected with the first upper key switch through a first upper column line, the second upper contact is electrically connected with the second upper key switch through a second upper row line, the second lower contact is electrically connected with the second upper key switch through a second upper column line, the third upper contact is electrically connected with the first lower key switch through a first lower row line, the third lower contact is electrically connected with the first lower key switch through a first lower column line, the fourth upper contact is electrically connected with the second lower key switch through a second lower row line, and the fourth contact is electrically connected with the second lower key switch through a third lower column line.

5. The keyboard device according to claim 4, wherein the first upper row line and the first upper column line are collaboratively formed as the first upper key switch, the second upper row line and the second upper column line are collaboratively formed as the second upper key switch, and the first upper key switch and second upper key switch are collaboratively formed as a first key matrix, wherein the first lower row line and the first lower column line are collaboratively formed as the first lower key switch, the second lower row line and the third lower column line are collaboratively formed as the second lower key switch, and the first lower key switch and the second lower key switch are collaboratively formed as a second key matrix, wherein the first key matrix and the second key matrix have different arrangements.

6. The keyboard device according to claim 5, wherein the arrangement of the first key matrix is identical to an arrangement of the first key and the second key, and the arrangement of the second key matrix is different from the arrangement of the first key and the second key.

7. The keyboard device according to claim 1, wherein the control unit contains plural first predetermined key codes corresponding to a first key matrix and plural second predetermined key codes corresponding to a second key matrix, wherein when the control unit receives both the first key code and the second key code, the control unit acquires the first predetermined key code corresponding to the first key from the plural first predetermined key codes and acquires the second predetermined key code corresponding to the first key from the plural second predetermined key codes, wherein the key signal corresponding to the first key is outputted from the control unit according to the first predetermined key code corresponding to the first key and the second predetermined key code corresponding to the first key.

8. The keyboard device according to claim 7, wherein when the control unit receives the first key code but does not receive the second key code, the control unit acquires the first predetermined key code corresponding to the first key from the plural first predetermined key codes and does not acquire the corresponding second predetermined key code, the key signal corresponding to the first key is not outputted from the control unit,
   wherein when the control unit receives the second key code but does not receive the first key code, the control unit acquires the second predetermined key code corresponding to the first key from the plural second predetermined key codes and does not acquire the corresponding first predetermined key code, the key signal corresponding to the first key is not outputted from the control unit.

9. The keyboard device according to claim 1, wherein the keyboard device further comprises a supporting plate, and the supporting plate is located under the membrane switch circuit member,
   wherein the first key comprises:
      a first keycap exposed outside the keyboard device;
      a first scissors-type connecting element arranged between the supporting plate and the first keycap, wherein the supporting plate and the first keycap are connected with each other through the first scissors-type connecting element, so that the first keycap is movable upwardly or downwardly relative to the supporting plate; and
      a first elastic element arranged between the first keycap and the membrane switch circuit member, wherein while the first keycap is depressed to push the first elastic element, the membrane switch circuit member is pressed by the first elastic element, so that the first upper key switch and the first lower key switch are triggered.

10. The keyboard device according to claim 1, wherein the keyboard device further comprises a supporting plate, and the supporting plate is located under the membrane switch circuit member,
    wherein the second key comprises:
       a second keycap exposed outside the keyboard device;
       a second scissors-type connecting element arranged between the supporting plate and the second keycap, wherein the supporting plate and the second keycap are connected with each other through the second scissors-type connecting element, so that the second keycap is movable upwardly or downwardly relative to the supporting plate; and
       a second elastic element arranged between the second keycap and the membrane switch circuit member, wherein while the second keycap is depressed to push the second elastic element, the membrane switch circuit member is pressed by the second elastic element, so that the second upper key switch and the second lower key switch are triggered.

* * * * *